UNITED STATES PATENT OFFICE.

WILLIAM HUGH PIERSON, OF NEW ORLEANS, LOUISIANA.

IMPROVED PLASTIC COMPOUND MADE FROM VEGETABLE FIBERS.

Specification forming part of Letters Patent No. 65,267, dated May 28, 1867.

*To all whom it may concern:*

Be it known that I, WILLIAM HUGH PIERSON, late of Orange, Essex county, New Jersey, but now residing temporarily at New Orleans, Louisiana, have invented or discovered a certain new and useful art—viz., the art of manufacturing certain useful and ornamental articles out of plastic, and of combinations and admixtures therewith of various other substances, as hereinafter more particularly described, and which art I call the plastic art, and the manufactures, plastic manufactures; and I hereby declare that the following is a full and sufficient description thereof.

The nature of the invention consists in acting upon cotton, hemp, flax, grass, wood, starch, sugar, or other equivalent vegetable matter by acids, &c., as herein shown, to soften, modify, and render soluble, or partly soluble, said vegetable matter in other solvents than said acids, and thereby render the said vegetable matter capable of being molded into forms applicable to the useful arts in several different ways, and for different purposes; and vegetable matter so changed is what I denominate "plastic."

To enable others skilled in the arts to make and use my invention, the fiber of cotton, flax, &c., may be digested in nitric acid, or a mixture of nitric and sulphuric acids, by which means the cotton, &c., is changed and converted into a material called by different names. When applied to fire-arms or blasting, it is called "gun-cotton;" when prepared for application to photographic purposes, it is called "collodion;" when the material is referred to as a distinct chemical substance, it is denominated "pyroxyline," and has a near chemical relation to xyloidine, or altered cellulose. In the first case, the material is treated with great care, and under specific directions, to develop the explosive properties. In the second, the material must be so treated that the pyroxyline is fully soluble in ether and alcohol, &c., while for my plastic agent the first of the above-named processes would quite unfit it for my purposes, explosiveness being very undesirable for the plastic manufactures, and so, also, the variety of pyroxyline or gun-cotton used in the photographic arts, though it may be used for some of the plastic manufactures, is more or less objectionable, partly on account of its explosive qualities, and, in some instances, on account of its too great solubility, and, also, on account of its costliness, especially when in the condition of ordinary photographic or surgical collodions. It is true that in some cases I use my plastic in a state nearly dissolved, but in many more I make sure that it shall be only softened or pulpified. It is likewise true that the plastic most desirable for my manufactures, and which I ordinarily use, is neither fairly explosive nor fairly soluble, and none of the articles manufactured therefrom are explosive, and some of them only gradually crumbling to pieces under a red heat.

The plastic material used by me for the finest work is made by immersing cotton fiber in nitric acid, or a mixture of nitric and sulphuric acids, wetting the whole mass, and retaining the materials in contact for a greater or less time, (fifteen minutes will suffice for most purposes,) and then washing out the acids with water. When I wish a coarser article, I substitute flax, hemp, grass, or sawdust, &c., and treat them substantially in the same manner as the cotton fiber. The product of this treatment is now ready to be submitted to the action of alcohol, ether, &c., to fit it for combination with other substances, as well as for molding and other applications.

I make my plastic manufactures as follows: For variety No. 1, take of plastic (*e. g.*, plastic cotton) one part, by weight, and wet it with two parts of alcohol and two parts of ether. This mixture is applied to cotton batting, or any equivalent fiber, or spread on any mold or surface of any desired form. When this solidifies it is completed. Greater condensation may be effected, if desired, by mechanical pressure, as by rollers and by other means. The use of so small a quantity of the solvents will not completely dissolve the plastic, but puts it in a condition much more favorable than a solution for molding, and for combination with various other substances previous to molding, and results, on the evaporation of the solvents, in a firm, strong, and durable fabric suitable for statuary, architectural and other moldings, furniture, vessels, and tubes for containing and conveying liquids and gases; for all those articles, as buttons, combs, toilet articles, &c., now made of hard rubber, gutta percha, papier-maché, &c.; and for imitations of shell, horn, ivory, and bronze manufactures, wood carvings, &c., by means of coloring, &c., as hereinafter set forth, and forms the type of articles herein.

In practice, I propose to produce the fabrics above named by mixing the plastic and solvents with mineral or vegetable powders, as sand, powdered stone, glass, brick, earthenware, &c., carbonates of lime, sawdust, charcoal, and other carbonaceous substances, bronze, powdered metals, and metallic oxides, paints, oils, and dye-stuffs, from all of which combinations good and durable structures result, as well as cheapness, diminished combustibility, and the ready imitations, as above indicated.

It will be easily seen that the above plastic mixture and the manufactures resulting therefrom are very different from those solutions of gun-cotton called "collodion," and the results obtained therefrom in the photographic and surgical arts, although it must be confessed that these collodions might be used as a substitute for the basic mixture of plastic and its solvents for my plastic manufactures, though at a much greater cost and at numerous other practical disadvantages, in the working up of my fabrics.

Variety No. 2 embraces cloth-like fabrics, cloth, bands, cordage, &c. As a type of this manufacture, take cotton batting, or other unwoven texture, in layers, and wet it with a mixture of plastic, one part; alcohol, twenty-four; and ether, eight. (These proportions may be varied, but those given are good.) The fabric may then be pressed or dried, which makes the cloth. Extra strength may be secured by crossing the layers or otherwise intermingling the raw fibers. For cordage they should be twisted. A plain cloth is to be made on a flat surface, and may be pressed or run between rollers to finish it. If made into garments, or tubes, bags, &c., molds may be needed for the purpose. By the combination of coloring-matter with this article, imitations of leather and other materials will be made which may be water-proof or air-proof cloths. Among these plastic cloths is one made with very little or no raw fiber, so as to be more or less transparent. A good mixture for this purpose is, plastic, one part; alcohol, four; ether, eight; boiled oil, four. If it is wished to have the membrane slightly porous, turpentine or naphtha may be added. To make this plastic membrane it is only necessary to spread the mixture on a solid surface of the desired shape and allow the vaporizable fluids to evaporate. These cloth-like fabrics are useful for many of the purposes for which leather and oil-cloths are now used, and instead of many of the flexible rubber cloths, as for water-proof garments, flexible tubing, &c.; also, in some instances, for cordage, for transparency in place of glass, and for painters' canvas. Where more stiffness is required, it may be secured by using larger proportions of plastic in the basic mixture, or by carding or otherwise intermixing a proper amount of plastic fiber with the raw fiber before wetting it, while greater flexibility is secured by combining oil with the basic mixture.

I make imitations of fur, plush, flock, &c., by affixing fur, plush, &c., to a foundation of the above material by means of plastic.

It is obvious that other foundations—e. g., woven cloth or felt—may be used for the purpose, though the above unwoven plastic cloth is the best. This is useful for hats and artificial fur skins, the artificial skin having the advantage over the natural one of being waterproof and less destructible by atmospheric and chemical agencies. Other short fibers—as cotton, wool, silk, and yarns of the same—may be made up in a similar manner.

Variety No. 3 consists in rendering woven or other manufactured cloths water-proof by means of plastic. As types of this kind, I take woven fabrics of cotton, flax, hemp, wool, silk, &c., stretch, and then coat or saturate the article with a mixture of plastic with its solvents, alone or admixed with oil, coloring-matters, &c. A good mixture for this purpose is, plastic, one part; ether, eight; and alcohol, eight to twenty-four. Other proportions may be used, according to the nature of the article operated on and the special result to be obtained. The above makes a good water proof cloth, but somewhat stiff. Where greater flexibility is required, some drying-oil may be added to the plastic mixture, a good mixture for the purpose being, plastic, one part; alcohol, four; ether, four; boiled linseed-oil, four, the mixture to be applied to the cloth as the above. Another plan is to treat the cloth with oil first and with a plastic mixture afterward. The above proportions are good in practice; but I do not confine myself to them, as a wide range of proportions may be used.

For woolen cloths a good mixture is, plastic, one part; alcohol, sixteen; ether, sixteen; boiled oil, two; turpentine, four; then applied to one side of the cloth, or between two layers of cloth. This can be so applied as to leave one surface of the cloth with its original appearance, while the other is water-proof, and is consequently well adapted for water-proof clothing. Any of the above may be successfully colored by mixing oil-paints in the plastic mixture containing oil, or any coloring-matter soluble in alcohol, ether, or turpentine.

Variety No. 4 consists in the combination or admixture of plastic and its solvents with metals, metallic oxides, silicious, argillaceous, and other stony powders, pigments, oil-paints, carbon, carbonates of lime, as well as woods, dye-stuffs, and carbonaceous substances generally for coloring and for other purposes herein mentioned. The following are instances:

In metals, take plastic, one part; alcohol, four; ether, two; iron in powder, two—steel filings or other metals in a pulverulent state may be substituted for the iron—giving on the evaporation of the fluids a firm coat, or other structure of a fine metallic appearance, and some of them admitting of gilding. In metallic oxides, plastic, one part; alcohol, eight; ether, eight; zinc oxide, eight—a rigid mixture. For an elastic mixture, take plastic, one part; alcohol, eight; ether, eight; boiled oil, eight; zinc oxide, sixteen. Oxide of lead or other metallic oxide may be substituted for the zinc, and many other proportions may be used. These combinations with metallic oxides are useful as paints and preservative coatings for wood, iron, stone, plaster, &c.

In silicious and argillaceous compounds, take plastic, one part; alcohol, four; ether, two; sand, five. Powdered quartz or glass, or any silicious or argillaceous powders, natural or artificial, may be substituted for the sand. The addition of oxide of lead with oil is often useful in these stony compounds—some of these combinations require a red heat to destroy them. They are useful as preservative waterproof and fire-proof paints or coats for protecting roofing, for example. Some of them also make excellent statuary and good stuccos.

In carbons, &c., take plastic, one part; alcohol, four; ether, four; charcoal powder, one to sixteen. Lamp-black or plumbago may be substituted for the charcoal, sawdust, straw, or any vegetable powder or fiber may also be substituted for the charcoal, and oil may often be added to advantage, useful for statuary and moldings, and some forms for paints, and some for marking-pencils, and for other purposes.

As a hydrocarbonaceous compound, take plastic, one part; alcohol, eight; ether, eight. To four parts of this mixture add one part of copal varnish. The copal varnish may be replaced in this mixture by any other resinous varnish, by india-rubber, gutta-percha, or any hydrocarbon, or any substance soluble in alcohol, ether, linseed oil, turpentine, benzine, or naphtha. The compounds with india-rubber and gutta-percha are among the least useful of these compounds.

A useful mixture for rough or first coating of wood, brick, iron, stone, plaster, &c., is plastic, one part; alcohol, eight; ether, four; common resin, six. Among compounds of carbon which make good structures with plastic may be instanced wheat flour. Other kinds of meal, as well as bran, may be substituted for the flour.

For calcareous compounds, take plastic, one part; alcohol, four; ether, two; chalk, one to four. Marble, plaster-of-paris, or any other calcareous compound may be substituted for the chalk. Useful, among other purposes, for statuary and moldings, and the chalk mixture for marking-pencils.

For paints, &c., take plastic, one part; alcohol, eight; ether, four. Add to this mixture from one to four parts of any oil-paint, or any coloring-matter dissolved in oil, alcohol, ether, turpentine, benzine, or naphtha, to be used as a paint for all the purposes of coloring for which paints are used. In this, as in the other instances, I do not confine myself to the precise proportions stated, because I find that the plastic can be usefully combined in a great variety of proportions.

In fine, my numerous trials of the above-mentioned mixtures, and others not mentioned, enable me to affirm that plastic is capable of being combined and worked up so as to make useful and ornamental structures, as mentioned, with any substance, in a proper state of division, and at suitable temperatures, except a few of the most active acids and alkalies; and in thus establishing the practicability and showing the mode of making this very great variety of useful articles by the use as a basic material of this article plastic, of which it may be said that a few varieties only have ever before been known, and none of its varieties put to any other practical use than for explosive purposes, for photography, and as an adhesive plaster in surgery, and, perhaps, as an unimportant varnish for paper, which said uses I do not claim.

I do claim to have discovered or invented a new and useful art—the art of plastic manufactures, as above described.

Having described the nature of the invention and several modes of carrying the same into useful manufactures what I claim as my invention, and desire to secure by Letters Patent, is—

1. The formation of articles of manufacture resembling stone, wood, whalebone, shell, horn, and other rigid or elastic articles out of plastic or semi-soluble pyroxyline prepared substantially in the manner and for the purposes herein set forth.

2. The combination of plastic, as above described, with vegetable or any other foreign matter, substantially in the manner and for the purposes set forth.

3. Making woven cloths and other fabrics water or air proof by treating them with plastic, substantially as and for the purpose set forth.

4. The combination of plastic with drying-oils for water-proofing and transparencies and other purposes.

5. Combining plastic with metals and various metallic substances in the pulverulent state, substantially as described.

6. Attaching, by means of plastic, fur, plush, or other short fiber, to any suitable surface, so as to give a fur-like surface, substantially as set forth.

7. Forming a compound for painting and coloring and other purposes by admixture of plastic and solvents with paints, oils, dye-stuffs, and other coloring-matters.

WM. HUGH PIERSON.

Witnesses:
GEO. W. COLLIER
L. D. GALE.